United States Patent [19]

Gloski

[11] Patent Number: 5,070,423

[45] Date of Patent: Dec. 3, 1991

[54] HIGH-PERFORMANCE ACTUATOR ARRAY FOR DISK DRIVE WITH UNITARY ACTUATOR GUIDE MEANS

[75] Inventor: David Gloski, Mountain View, Calif.

[73] Assignee: Unisys Corp., Detroit, Mich.

[21] Appl. No.: 836,950

[22] Filed: Mar. 6, 1986

[51] Int. Cl.[5] .................... G11B 5/55; G11B 21/10
[52] U.S. Cl. .................................................. 360/106
[58] Field of Search ........................................ 360/106

[56] References Cited

U.S. PATENT DOCUMENTS

| | | |
|---|---|---|
| 4,318,145 | 3/1982 | Frandsen .............................. 360/106 |
| 4,396,966 | 8/1983 | Scranton et al. ..................... 360/106 |
| 4,475,136 | 10/1984 | Manzke et al. ...................... 360/106 |

*Primary Examiner*—Robert S. Tupper
*Attorney, Agent, or Firm*—John J. McCormack; Mark T. Starr

[57] ABSTRACT

Disclosed are reciprocating carriage arms carried on roll bearings engaged on guide rails, where the arms are independently driven, having common "shared" magnet means. The coil-mounting portion of each arm is "twisted" 90° so the set of coil units align along a common "magnet-plane" spanned by common drive magnet means. Also, the arms each mount three load-beams (heads) in "staggered" array to thus shorten the arm-stroke. Opposing sets of the guide rails are provided each on a unitary guide plate with the plates being coupled capturing the respective roll bearings therebetween for a unitary guide box means for all the carriage arms.

6 Claims, 11 Drawing Sheets

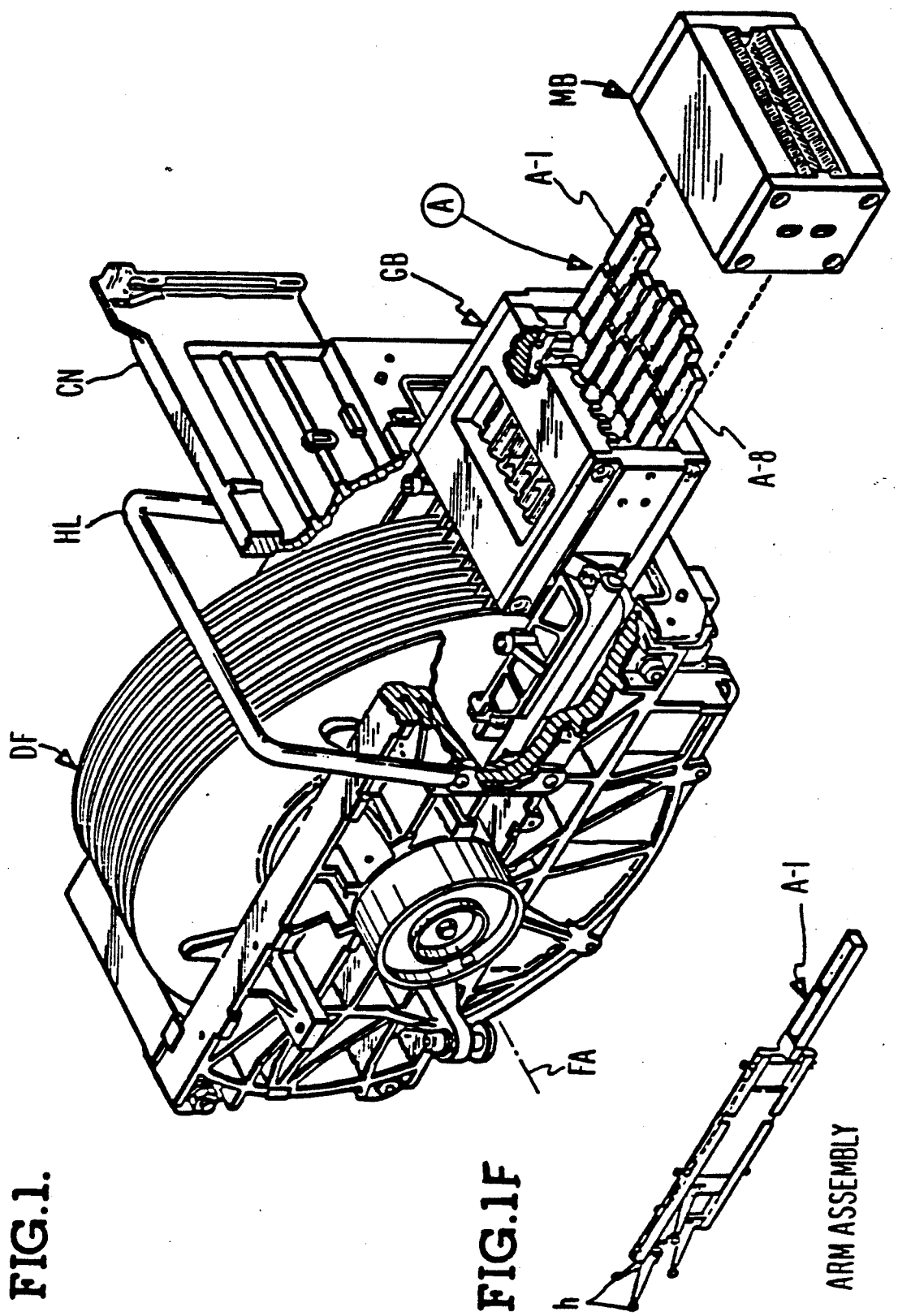

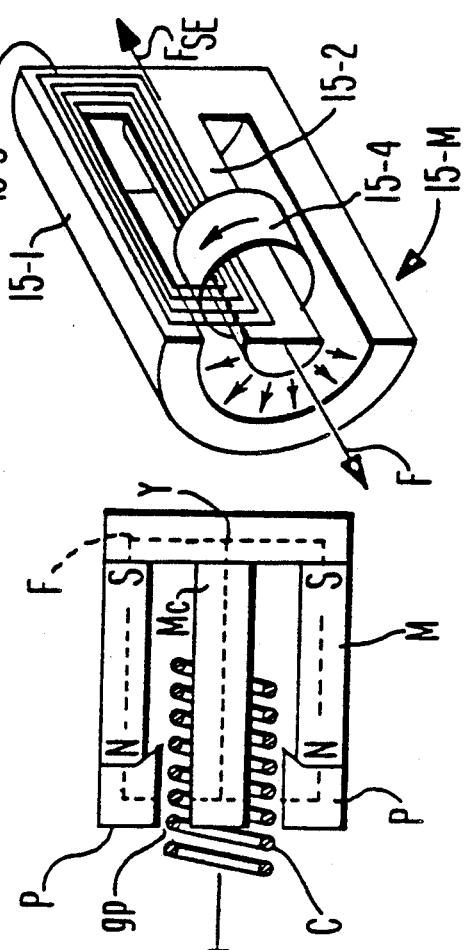
FIG.1A. Prior Art
FIG.1B. Prior Art
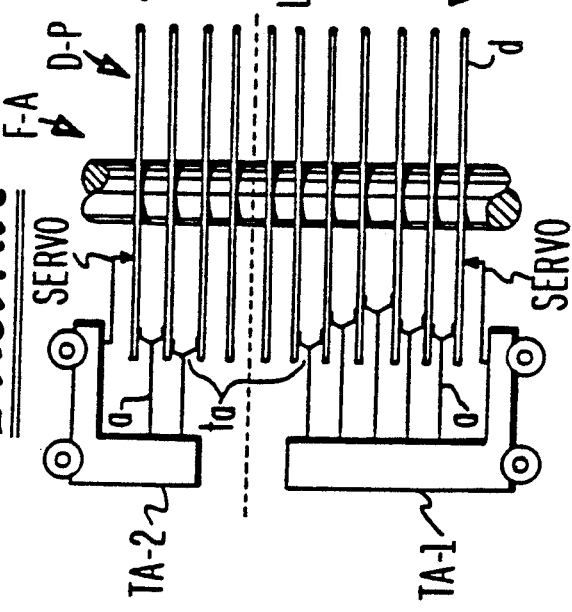
FIG.1C. Prior Art
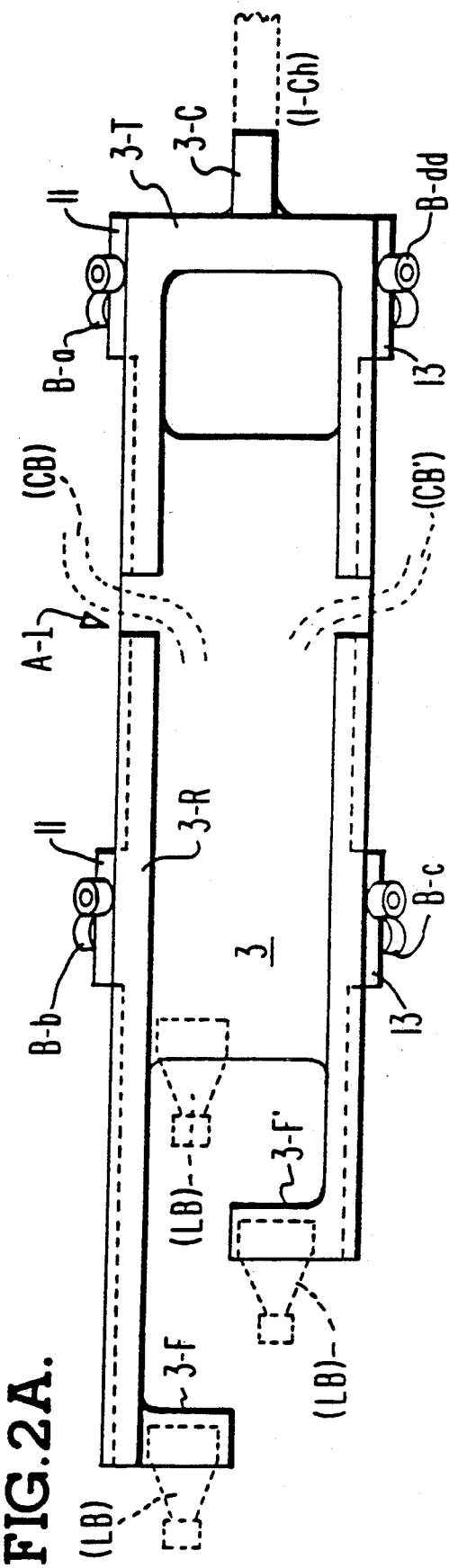
FIG.2A.

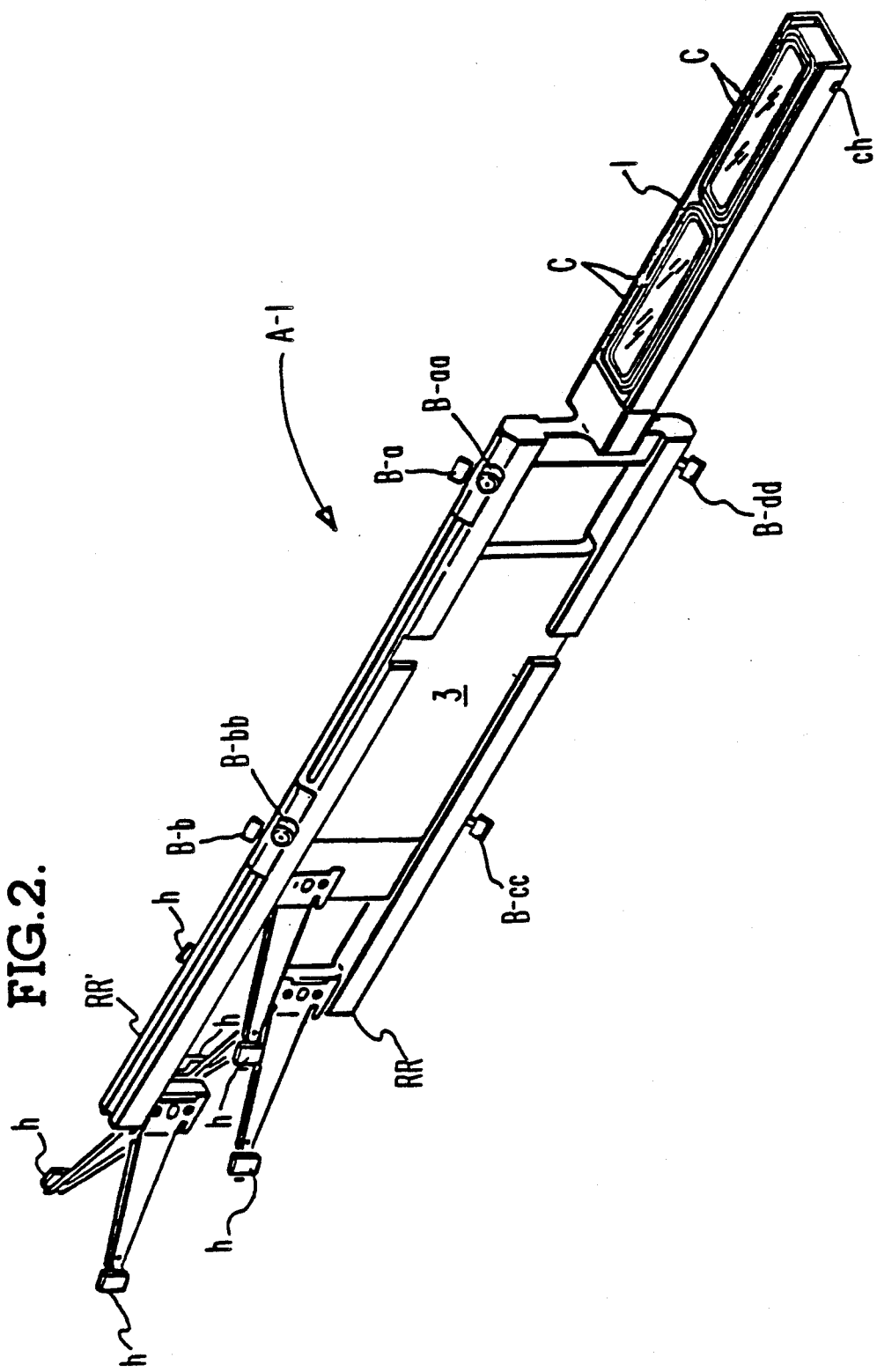

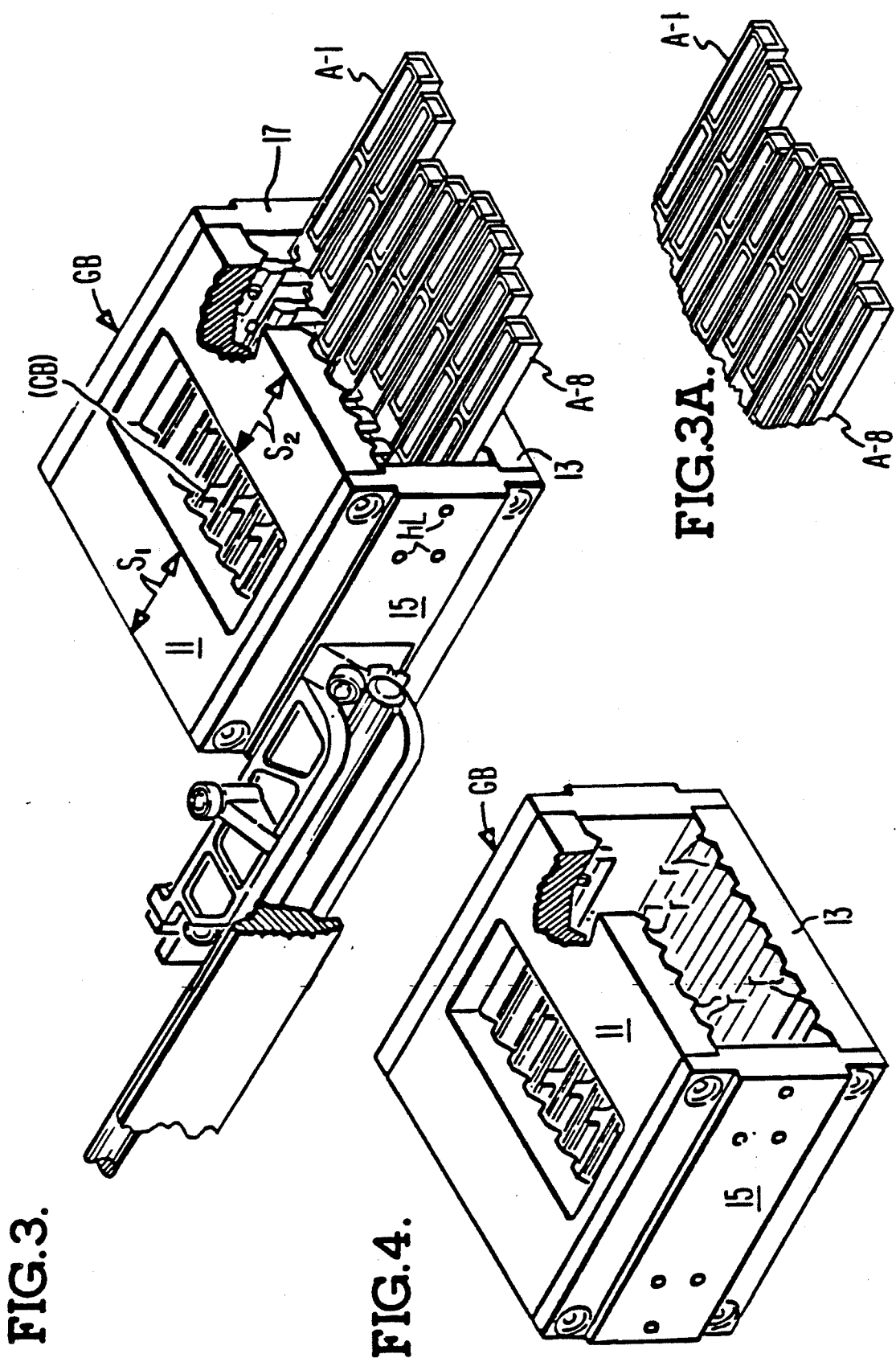

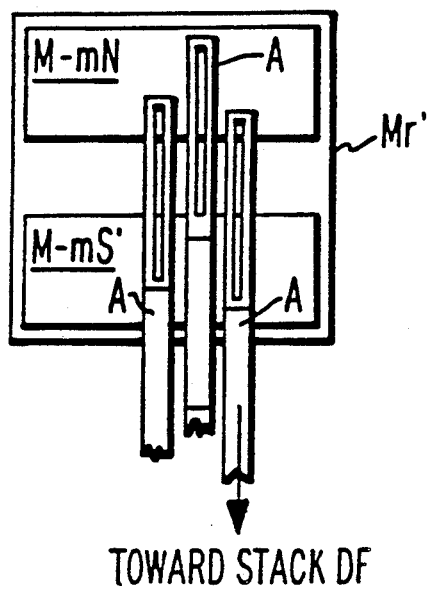
FIG.7-B.
TOWARD STACK DF
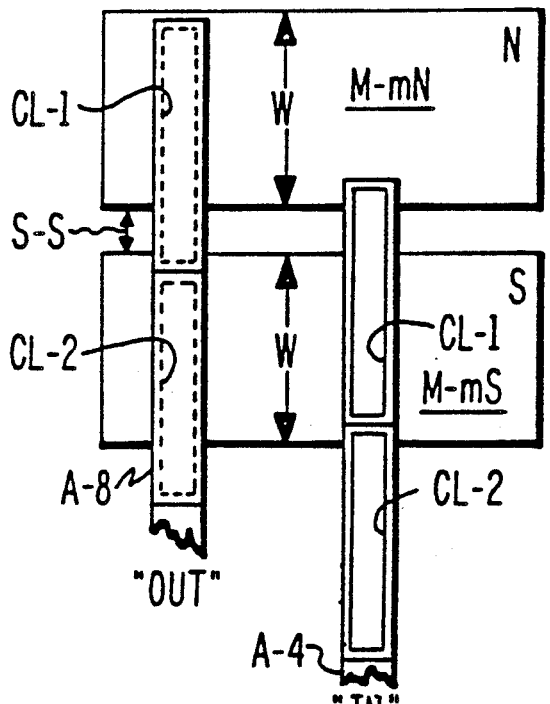
FIG.7-C.
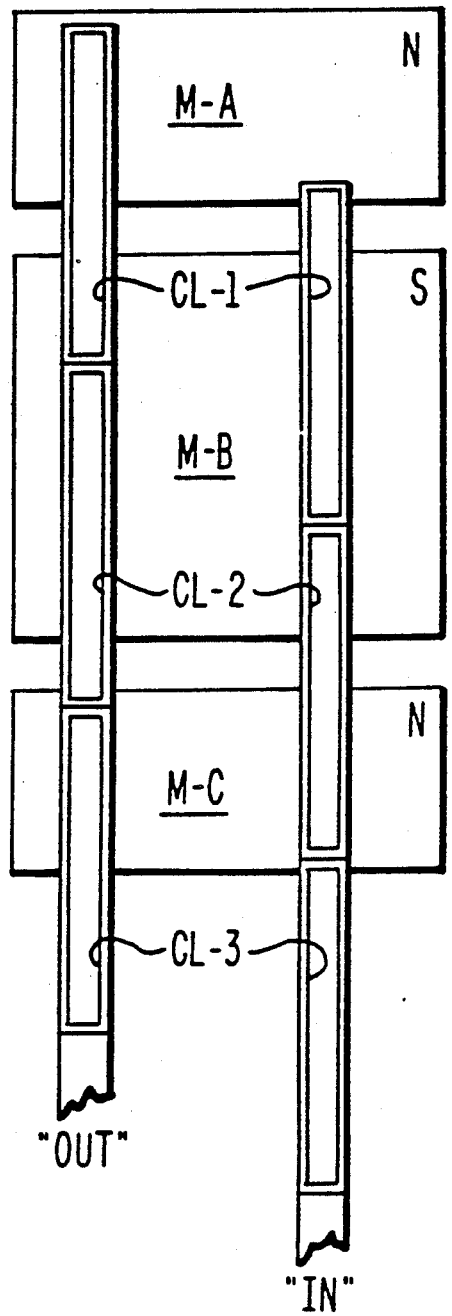
FIG.7-D.
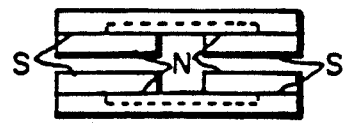
FIG.7-C-1.
FIG.7-D-1.

FIG. 7-E.
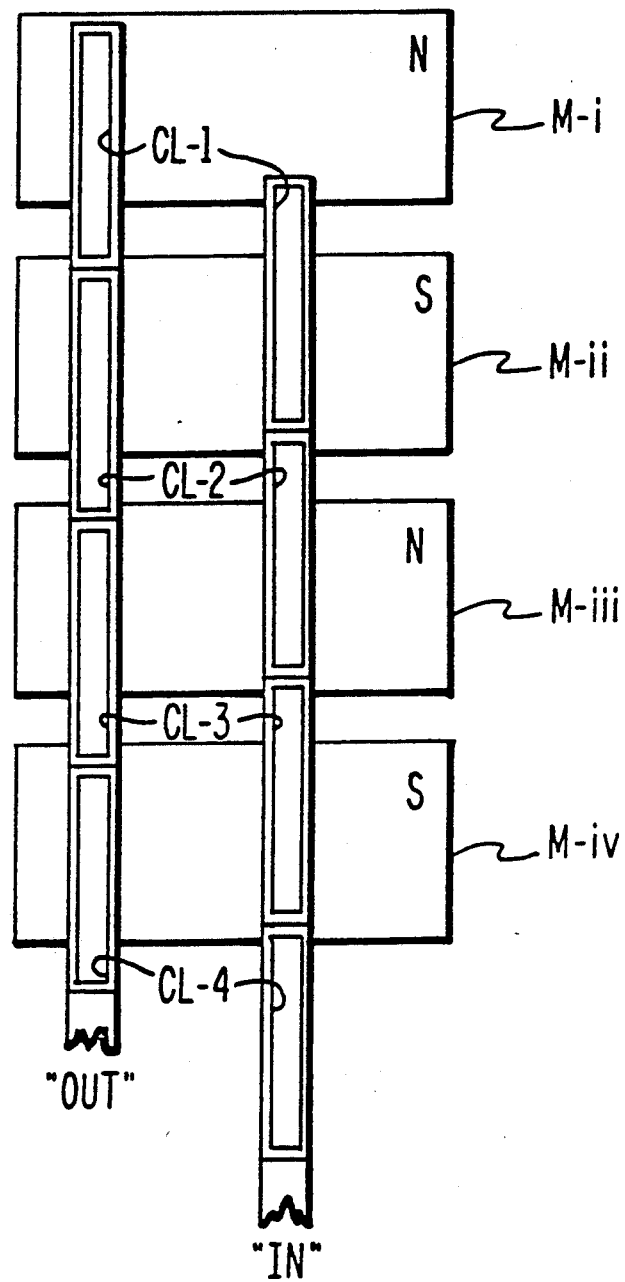
FIG. 7-E-1.
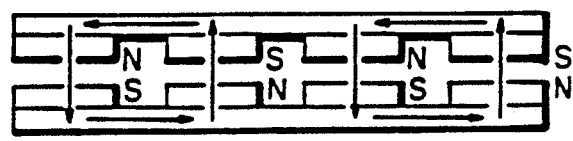

HIGH-PERFORMANCE ACTUATOR ARRAY FOR DISK DRIVE WITH UNITARY ACTUATOR GUIDE MEANS

BACKGROUND, FEATURES OF INVENTION

This invention relates to novel actuator means for disk drives.

Workers are familiar with magnetic disk files as used for recording and storing data in data processing. Such disk files are intended to facilitate rapid data recording and transfer at random addresses along the disk tracks.

Workers know that the transducers used with such disk recording surfaces must be reciprocated very rapidly between selected address locations (disk tracks), yet with high precision. It will be recognized as important for such a system to move a transducer very rapidly between data locations; and to do so with high positional accuracy between closely-spaced track addresses. This gets quite problematic as track density increases. Disk storage systems heretofore have mounted each transducer head on a "load beam" carried by a carriage. This carriage has been mounted between track ways for reciprocation by associated actuator means. This disclosure relates to improving the way such carriages are disposed, guided and actuated.

Workers realize that the present thrust toward ever greater disk storage capacity and decreased access time means that closer control must be exercised over the actuator mechanism for precisely and rapidly positioning transducer heads over any selected disk track; also the carriage and other actuator parts must be made yet simpler and lighter to accommodate such fast, precise positioning. This disclosure concerns an improved way of disposing carriages and associated means.

KNOWN POSITIONERS

Transducer actuators (linear positioners) employed with magnetic disk memory systems are subject to stringent requirements; for instance, these systems typically involve a stack of several magnetic disks, each with many hundreds of concentric recording tracks spanning a radius of 4–12 inches; with a head-carrying arm typically provided to access each pair of opposing disk surfaces. This arm will typically carry two to four heads so that it need be moved only about 2–3 inches to position its head adjacent any selected track. Thus, it will be appreciated that such applications involve extreme positioning accuracy together with very high translation speeds (to minimize access—a significant portion of which is used for head positioning). Such a positioner must move its transducer heads very rapidly so that the associated computer can process data as fast as possible—computer time being so expensive that any significant delay over an extended period (of even a fraction of a millisecond) can raise costs enormously ("transition time", during which heads are moved from track to track, is "dead time" insofar as data processing is concerned, of course).

Thus, computer manufacturers typically set specifications that require such inter-track movements to take no more than a few milliseconds. Such high speed translation imposes extreme design requirements; it postulates a powerful motor of relatively low mass (including carriage weight) and low translational friction.

Another requirement for such head positioners is that they exhibit a relatively long stroke, on the order of 0.5–4 inches or more, in order to minimize the number of heads required per recording surface.

The prior art discloses many such positioner devices, including some intended for use in magnetic disk memory systems: e.g., see U.S. Pat. Nos. 4,506,307; 3,135,880; 3,314,057; 3,619,673; 3,922,720; 4,001,889; 4,150,407; 4,318,145; 4,423,448; 3,544,980; 3,646,536; 3,665,433; 3,666,977; 3,827,081; 4,331,990; 4,414,594 and 3,922,718 among others. (See also "A Novel, High Performance, Low Mass Disk Head Actuator", IEEE Trans. on Magnetics, Vol. MAG-19, No. 5, September 1983, PP. 1962, by R. A. Scranton, et al.)

Among prior art approaches are the "Head-per-Track" approach whereby (some or all) disk faces, or pair thereof, are provided with a head which is "dedicated" to a respective track. This will be contrasted with the more usual "movable head" systems, which may be used alone, or with such a "Head-per-Track" arrangement; the latter here covering some of the tracks in some or all of the disk faces.

Workers recall that such actuator carriages are driven by various actuator mechanisms, including the well known "voice coil" motor (VCM, comprising a solenoid like those used to drive an audio speaker). Such are explained in U.S. Pat. No. 4,423,448, as are various "flat-coil" actuators.

FIG. 1A shows a simplified view of a prior art disk pack D-P understood as comprising an array of like recording disks d mounted to be co-rotated on a common spindle and spaced uniformly therealong, each disk having a pair of recording faces with a plurality of concentric recording track sites and being accessible by read/write transducer such as those indicated (e.g. Tr). The indicated transducers are mounted in pairs from a common access arm a, with a plurality of arms projecting in common from a single transducer actuator (e.g., TA-1) adapted to reciprocate the arms in common to position one of its heads above an associated selected track site, as well known in the art.

A disk drive (DD) will be understood conventionally as a mechanism that holds several magnetic disks, keeps them spinning, and moves the read/write heads into position when information must be read from, or stored on, one of the disks.

Such a two-actuator file is relatively conventional (file F-A), wherein the "lower" set of disks d are understood as accessed by associated arms and heads projecting in common from a lower actuator carrier TA-1, while the "upper" disks d are similarly accessed by an associated upper carrier TA-2. Each actuator array will, typically, also have a conventional servo arm and head as indicated. Each arm a may carry one or two pairs of transducer heads, one head in each pair being presented to a respective one of the two opposing disk faces in each subject file gap. Thus, file F-A may comprise a pair of head-actuators TA, each of which presents several actuator arms, each arm having two pairs of opposed transducer heads and being projectible into one of the associated gaps, as known in the art.

VOICE-COIL ACTUATOR: FIGS. 1B, 1C

FIG. 1C depicts, very schematically, a relatively conventional cylindrical solenoid 15-M (of the VC-M type, as in FIG. 1B also) comprising a permanent magnet source of magnetic flux comprised of a cylindrical, or semi-cylindrical, shell 15-1, with an inner core 15-2, core 15-2 being encircled by a moving solenoid coil 15-4. Coil 15-4 will be recognized as conventionally translated along core 15-2 when energized with current (due to inductive interaction with the magnetic flux—see arrows emanating between core 15-2 and peripheral magnet parts 15-1). Force arrow F indicates the resultant reciprocal translation forces so developed—the force direction being determined by direction of current through coil 15-4, as well known in the art.

The magnetic flux field set-up by coil current will flow mainly through the "path of least reluctance" (as indicated by flux loops 15-3 through magnet 15-M).

A conventional linear actuator (such as used in the IBM 3330-3380 disk file products) uses a cylindrical coil (voice coil) in a permanent magnet assembly. The recording heads are attached to the coil through an arm-/comb structure so that 16 or more heads move simultaneously to address 8 or more disk surfaces.

One might attempt to eliminate this comb structure, allowing arms to actuate independently; e.g., to decrease access time. The typically small spacing between disks (~0.325 inches) greatly complicates the electromechanical design to achieve independent actuation. For such a design, one will likely want a separate magnetic circuit for actuating each of the arms.

FIGS. 1D, 1E schematically illustrate a variation of a known sort of "flat coil" linear positioner A-m which can be considered as comprised of two primary assemblies: a mobile armature-carriage assembly A-c essentially including flat coils, head mount, roller bearing and support means; plus a fixed housing and permanent magnet structure A-g with the magnet shunts, sides, etc.

This array may be understood as incorporated in a magnetic disk memory system, including a plurality of disks in a conventional stacked array, arranged in vertical spaced relation with a related stacked array of head assemblies. Each head assembly (not shown) is mounted at the distal end of an armature carriage A-c to be reciprocated back and forth in its disk-gap relative to a respective pair of magnetic recording disk surfaces.

With selective positioning of each head assembly in a conventional manner, the "flat armature" (coil) means provided may be electrically energized to move into a retracted or extended position as known in the art (relative to associated pair of disk surfaces) and read or record information on any selected track thereof. Thus, the head assemblies are supported on actuator strip A-m, to be projected in cantilever fashion as part of a rolling carriage supported by rollers r and movable along track rails R. The reciprocating actuator assembly A-m, carrying coil C, is operable when coil C is current-energized in a conventional manner, to move the carriage along the associated cavity, toward and away from the disk stack between a plurality of precisely located addresses, these addresses, or track positions, determine the position of heads within the stack in the known manner. The opposite (rear) end of the actuators includes their flexible connector (head cable) means, and associated connections, these being provided conventionally and as known in the art.

Each actuator strip A-m includes two double roller assemblies r on each side thereof (or two such opposed by a single third roller as an option). These "dual-opposed" rollers are adapted, as known in the art, to engage a respective guide rail R as indicated in FIG. E in rolling contact when the assembly A-m is translated along its elongate axis (in moving head assembly h relative to track addresses on a respective pair of disks as well known in the art). Each actuator strip A-m is adapted to be so-reciprocated along a respective actuator cavity between opposed sets of permanent magnet poles m.

FIG. 1D illustrates details of such a flat coil actuator strip A-c where, according to various further features, the strip is formed into a relatively thin, light-weight, planar body and is adapted to receive flat coil winds (preferably as a printed circuit board PCB, with two or more flat, overlapped coils C printed thereon). Electronic circuit means e is also preferably mounted on each strip A-c at the designer's option (e.g., read/write electronics for the associated actuator).

Such a "flat armature" A-m will be understood to comprise a "planar trolley" carrying read/write heads at its distal end and mounted on bearings to be reciprocated freely along a track between upper and lower relatively flat opposing pole pairs.

The instant teaching illustrates ways to modify such actuator carriages, and array them for actuation by a common magnet array.

With such carriages, space is a particular challenge—especially where reliability and precise positioning must be maintained over millions of high-acceleration cycles, yet while minimizing cost of fabrication. And, with such a carriage mounted on a roller (or like wheel means) to reciprocate along track means, it is a particular challenge to fit the rollers and associated track means within the narrow inter-disk gap region.

Such problems are alleviated, according to this teaching, by making the receiving guide-ways (tracks) from a pair of opposed multi-track plates and disposing these plates as part of a guide box for the array of carriages.

COMPARISON WITH FIG. A

Workers recognize that the performance of the typical magnetic disk storage system depends to a great extent on the efficiency of its electromechanical actuator means (used to reciprocate the magnetic recording heads). As one feature hereof, we describe a high performance actuator characterized by an array of independently operated arms driven by a common ("shared") magnet array apt for high frequency, low friction operation and characterized by fast accessing and high data throughput.

Some features of this array are better appreciated by comparison with a relatively conventional linear actuator system of the type shown in FIG. 1A; especially one using a cylindrical voice coil/permanent magnet assembly, as for instance suggested in FIGS. 1B and 1C. Workers will recognize that here the heads and their associated arms are coupled to the drive coil through a "comb" structure. Thus, for instance, five arms and 10-20 pairs of heads may be carried on a comb like TA-1. These must be moved simultaneously to address the ten associated disk surfaces. Also, one of the head-arm means must typically be dedicated to providing servo information (that is, to read a disk surface dedicated solely to positional information—see "SERVO" in FIG. 1A). And, it is somewhat of a weakness that the positions of the remaining "data heads" must be inferred from the position of this dedicated "servo head".

Another disadvantage is that such a comb assembly must be quite heavy and rigid to minimize mechanical resonances between the heads and the bearing means, as well as to maintain precise correlation between data head position and servo head position. More generally it will be seen that the attendant high mass of such a multi-arm carriage necessarily limits its acceleration, increasing the required drive power for each accessing operation (head transfer operation); also it produces an undesirably high mechanical reaction force on its base plate, which thus must be a rigid, relatively massive base casting.

By comparison, our "shared magnet" independent actuators eliminate this massive, vibration-prone comb structure, and its associated "carrying truck"—they allow one to independently drive each single actuator arm instead of the massive "truck" each time a new data track (head) must be accessed. Each actuator fits into an associated inter-disk gap, and being a relatively light arm, can readily be independently actuated with increased acceleration and less power. Also it needs no massive base casting. A number of load beams (head suspensions) may be mounted directly on each such arm, thus eliminating "comb resonances" and the associated effects thereof. And, we avoid the conventional approach of requiring a positional signal from a dedicated disk servo surface; rather, each actuator is independently driven to access only two disk surfaces.

Thus, one object of this invention is to provide the mentioned and other features and advantages. Another object is to teach using an array of "carriage actuators" to be driven separately, yet by common ("shared") magnet means, especially as adapted for positioning heads in a disk drive. A related object is to adapt the array of actuator carriages to engage common guide means.

A further object is to provide multi-head disk drive positioners which are "modular", one for each disk gap.

Another object is to "miniaturize" head actuators for disk drives; a related object is to reduce their cost, weight and power consumption, while improving acceleration.

BRIEF DESCRIPTION OF THE DRAWINGS

The foregoing, and other related objects, features and advantages of the present invention will be better appreciated by workers as they become familiar with the following detailed description of presently preferred embodiments, these being considered in conjunction with the accompanying drawings, wherein like reference indicia denote like elements:

FIGS. 1A, 1B, 1C are simplified schematic drawings of prior art disk drive means; FIG. A: a head actuator array; FIGS. B, C: a voice coil in section;

FIG. 1D shows a more conventional actuator arm, while

FIG. 1 is a perspective schematic partial view of an improved disk drive embodiment with an array of independent "shared-magnet" actuator arms, one shown in partly-disassembled perspective view in FIG. 1F and in enlarged view in FIG. 2 and plan view in FIG. 2A; with the drive-coil segments of the array shown in FIG. 3 in enlarged perspective, disposed in a "guide box"; (the coil array shown alone in FIG. 3A) and with FIG. 4 showing this guide box;

GENERALLY RE FIGS. 1-7 EMBODIMENT

Figure 1D:
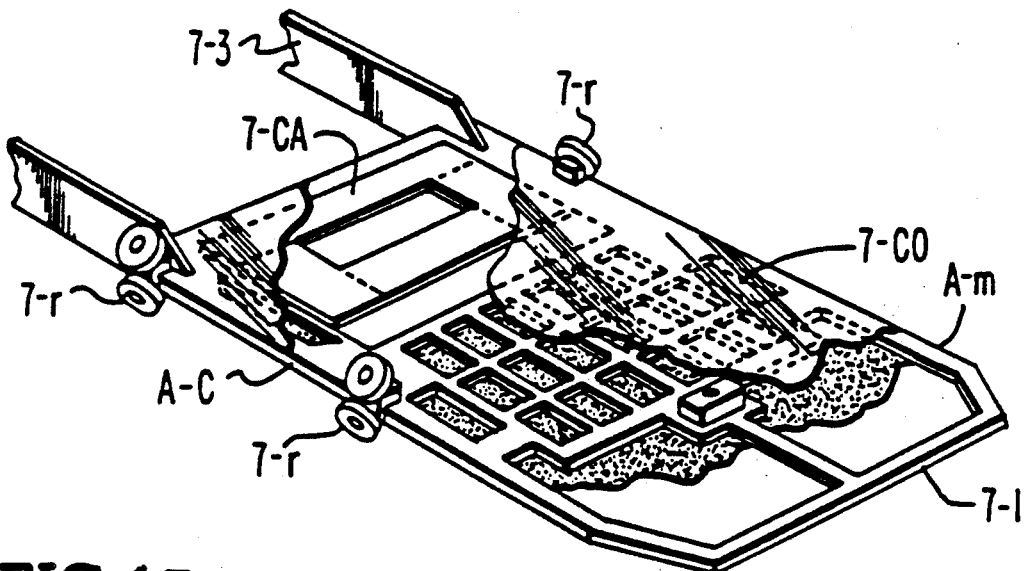
Figure 1E:
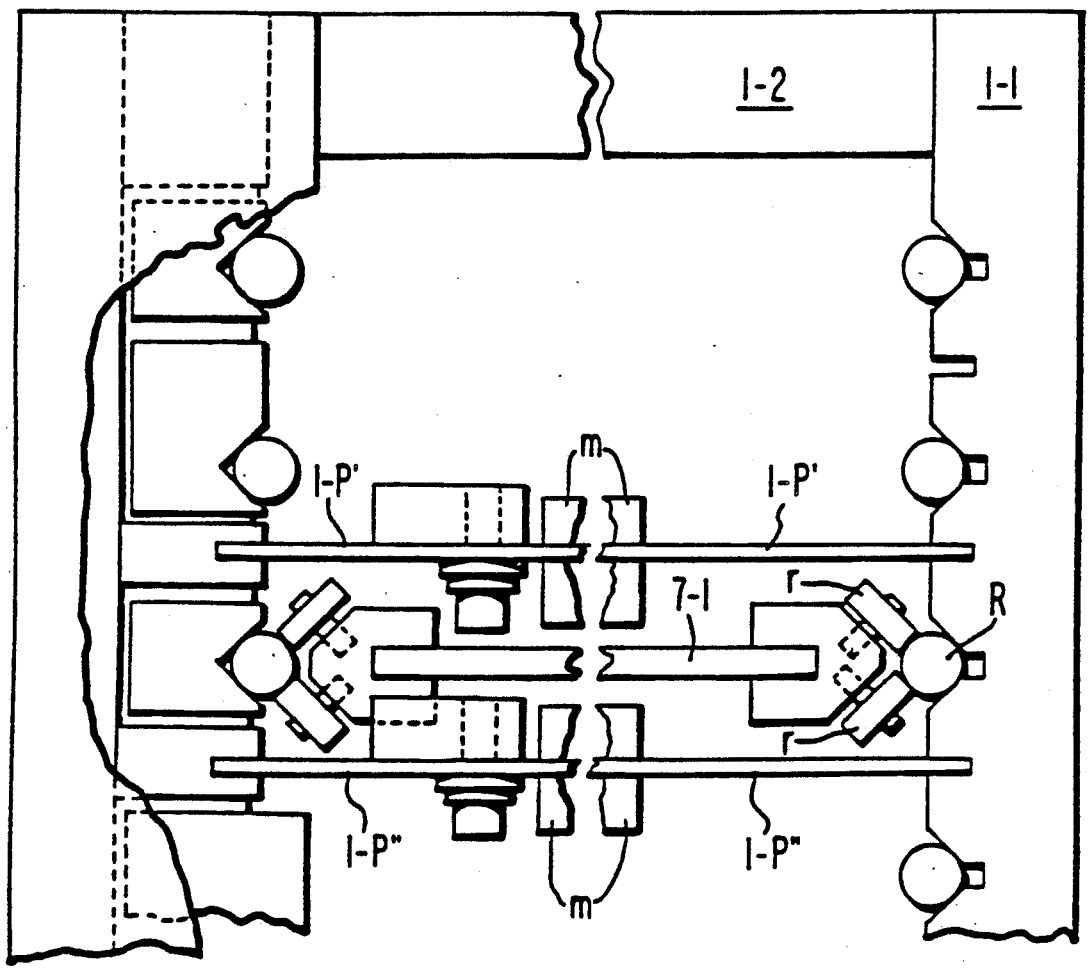
FIG. 1E shows such an arm assembled in a stacked array (end view)

FIG. 1 schematically illustrates a magnetic disk drive arrangement of a type used in high speed digital data processing and apt for use with the present invention; this embodiment and all others mentioned herein being understood as constructed and operating as presently known in the art and implemented (materials, methods, devices, apparatus, etc.) by known expedients according to present good practice, except where otherwise specified.

Figure 8:
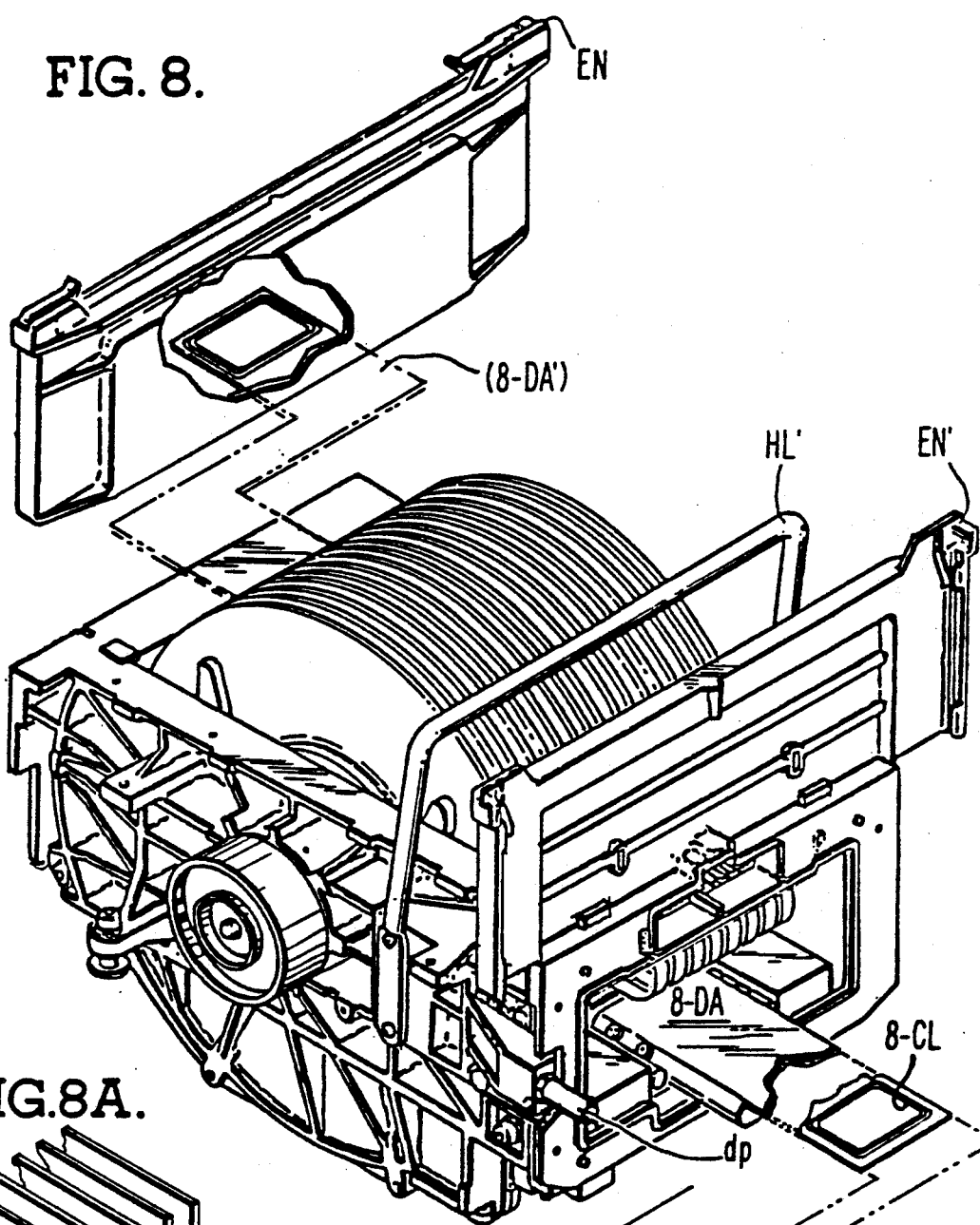
FIGS. 8 and 9 shown respective alternative disk drive embodiments in a view like that of FIG. 1 (the single arm shown alone in FIG. 8A).
Figure 8A:
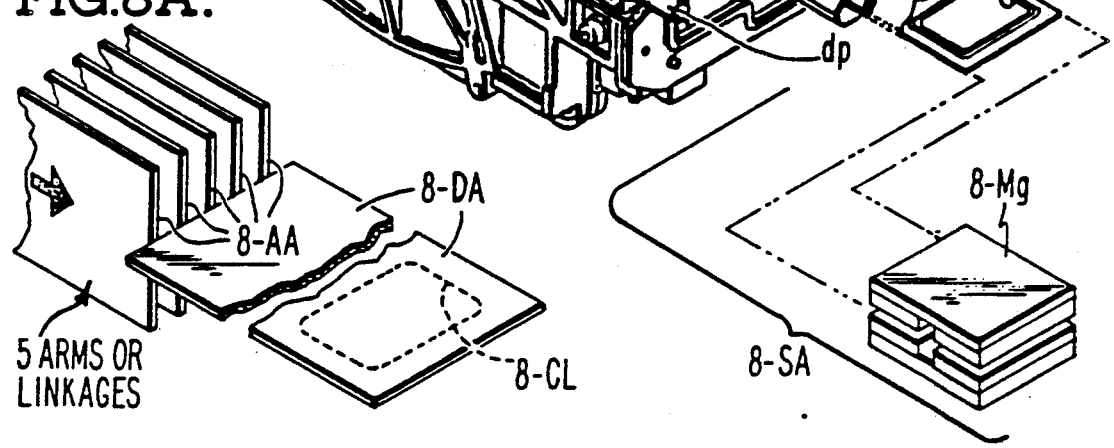

Among other things, workers will recognize that FIG. 1 shows a known sort of disk file DF embodied in a removable HDA unit (e.g., handle HL being provided for ready removal from the disk drive and mounting plate CN provided for adjacent location of chips and other miniature electronic parts as known in the art —FIG. 8 showing HL and CN more fully, though in a modified drive).

In association with one preferred embodiment wherein actuator arm (carriage) means are arranged and disposed to be "self securing" on at least some of their associated guideways, an array of "flat strip" actuator arms A is disposed in alignment so each may present an array of magnetic transducer heads h (see FIG. 1F; heads h each projected from the distal end of a respective arm via a "load beam" as known in the art). Each carriage is driven to thrust its heads into an associated inter-disk gap for recording and readout with respect to the disk surfaces, each actuator strip being individually operable, but "sharing" a common magnet, according to a feature hereof. That is, an actuator strip A is electromagnetically driveable by proper operative association with flux-presenting portions of a common magnet block MB according to special features hereof. The arms A are mounted in prescribed disposition and alignment via an associated "guide box" GB (both guide box and magnetic block described in more detail below). Such an array is particularly apt for advantageous use with an embodiment of the present invention described below (e.g., see FIGS. 2-7).

As workers know, the reciprocation stroke for such actuator strips will be a fixed distance ($R_s$). Now, a feature of guide box GB is that its upper and lower preloading guide plates 11, 13 (FIG. 3) will capture and position the arms A. These plates 11, 13 are apertured to allow access of electrical connector means (see CB) to each actuator arm (e.g., for coil-current, head signals, etc.). Thus, flexible cables may be introduced for connection (power, data transfer) to each arm. So, plates 11, 13 must present portions on either side of this opening which are long enough (rails there-along) to accommodate this stroke distance $R_s$. Thus, lengths $S_1$, $S_2$ along this direction on plate 11 will be so dimensioned that associated underlying roll means (B-b/B-bb for $S_1$; B-a/B-aa for $S_2$) will have adequate rail length to reciprocate on (cf. thus $R_s < S_1$; $R_s < S_2$).

Guide plates 11, 13 are connected by side plates 15, 17; and each side plate 15, 17 includes location-holes (hc) or like indentations to be engaged with connector means fixing guide-box position when the box is fastened on each side to a roll means RM (cf. rolls mounted from base shoe sh to roll along a track rail on each side), allowing arms (heads) to be rolled into their respective inter-disk gaps as a unit.

Now, this, or any similar, "guide box" could also be eliminated. This guide box GB is a convenience for adapting the subject "shared-magnet" actuator array to an existing HDA like the Memorex 3680 or IBM 3380 disk drive, using the rails thereof (e.g., see RM, FIG. 3) to slide the guide box, etc., in place. Of course, some sort of guides will, in any event, need to be provided.

According to this arrangement, a prescribed number of the individual, independently-operable actuator strips (arms) A is arrayed "horizontally" along the direction (axis FA) of stacking of the disks in file DF (i.e., parallel to their axis of rotation). One actuator strip A is provided for each inter-disk gap (nine disks shown here; thus eight such gaps, with one actuator A for each being understood; all eight actuator strips being essentially identical in structure and operation).

An exemplary actuator strip A-1 is shown in FIG. 1F and in enlarged perspective view in FIG. 2; in plan view in FIG. 2A, (array in FIG. 3A) and will be understood as, in general, comprising a thin, flat "base" section 3 (e.g., magnesium or other light, strong, non-magnetic material such as aluminum) flanked by a pair of lateral roller assemblies RR, RR', one on each side; and with a "twisted tail" section 1-ch mounting drive-coil means (see below). Strip A-1 is adapted to present a plurality of (six here) magnetic recording transducers h projected and mounted in appropriate known fashion (on load beams) from base means 3.

Each lateral roller assembly RR, RR' comprises two pairs of like roller means B, preferably comprising a "miniature ball bearing" like those sold by N.M.B. Co. (also called "rollers" here, and comprising a cylindrical barrel mounted for rotation on a shaft which itself rotates on "balls"), or a like roller means as known in the art. For instance, assembly RR' comprises a "left" pair of roller bearings B-b, B-a, together with an associated offset pair of "right" bearings B-bb, B-aa, each "left" bearing being offset by a prescribed like amount from its nearby right bearing to allow tapping of shaft-receiving holes. Opposite roller assembly RR is similarly constructed. And projected from the "near" end (heads h on the "distal" end) of base 3 is an electromagnetic "drive" segment 1 comprising coils embedded in epoxy or the like (one or several coils; preferably two as seen below).

Figure 5:
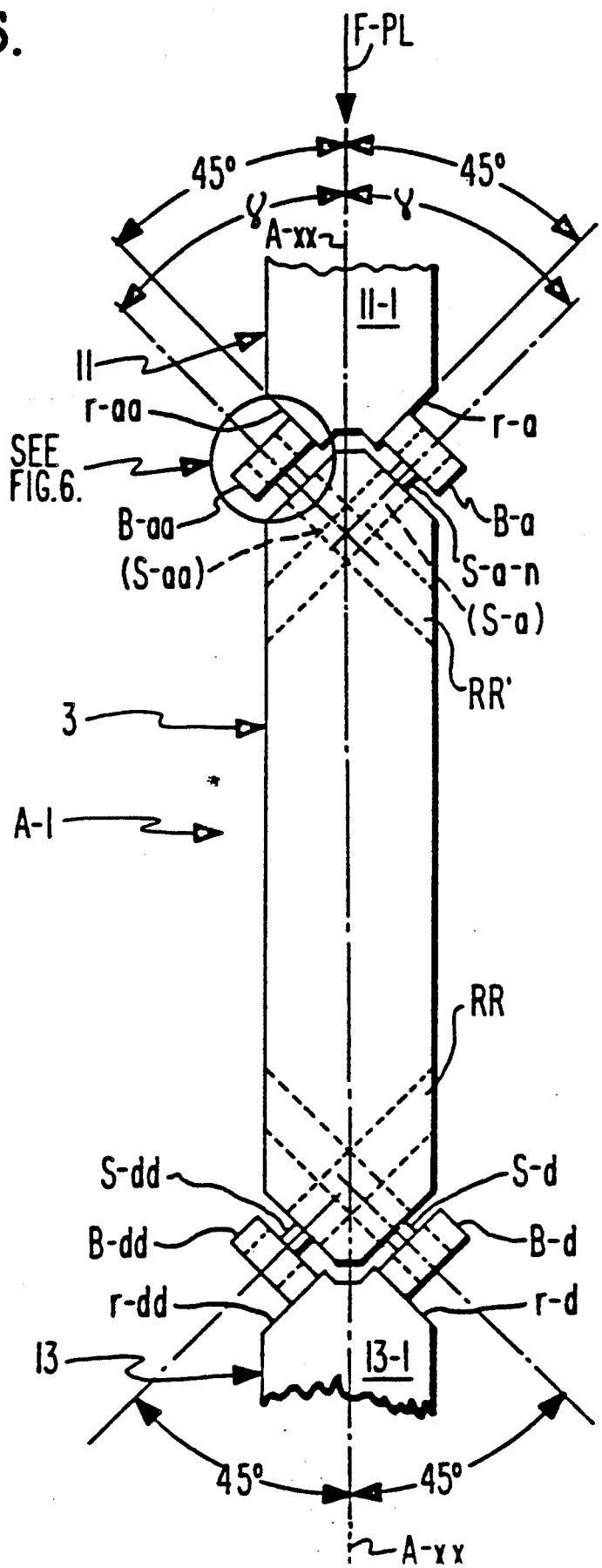
FIG. 5 is a fragmentary end section of one of the actuator arms from FIG. 2.

Each roll assembly with its two pairs of left and right bearings will be understood as adapted for precise rolling engagement with a respective "two track", guide or rail member (e.g., see FIG. 5, rail members 11-1, 13-1, each presenting a pair of tracks or "flats" r, each "flat" disposed to guidingly engage a respective bearing B—e.g., bearing B-a along flat r-a). For instance FIG. 5 shows exemplary arm A-1 with bearings B-a, B-aa engaged upon a respective rail 11-1 (flats r-a, r-aa thereof), while on the opposite side, bearings B-d, B-dd are engaged upon the associated rail 13-1 (flats r-d, r-dd). As a related subfeature, such upper and lower rail pairs 11-1, 13-1 are combined for the entire actuator array into a guide box GB, with the upper rails 11-1, 11-2, etc. integrated into an upper guide plate 11 and the lower rail pairs 13-1, 13-2, etc. into a lower guide plate 13, as shown in FIGS. 3 and 4 (FIG. 4 showing only part of the actuators).

Also, a portion of FIG. 3 is broken-away, giving a fragmentary view of a few bearings of A-1 and A-2 in engaged relation with their guide rails.

According to a preferred feature, one of the roll-assemblies (here RR') is made "flexible", having roll means adapted and disposed to be "splayed" or diverged, when forcibly engaged against their related rail (cf. B-a, B-aa vs. 11-1)—i.e., when thrust thereagainst with a prescribed (minimum) loading force F-PL. Force F-PL (from plate 11) will be just sufficient to spread-apart or "splay" the left and right roller bearings and so positively and precisely engage both roller surfaces in full "line contact" on both of the respective rail-flats. Workers should understand that a flexible roll assembly will have at least one in each pair of its roll means (bearing) adapted to so bend when pre-loaded; and, surprisingly, it is preferred that "not all" bearings be flexible, but that one pair have both flexible, and the other pair "only one" flexible. If all the bearings (on RR') are flexible, undesirable vibration, oscillation, "fish tail" and like twisting can result in operation, and precise, repeatable positioning be relatively impossible. Similar results accrue if no pair has both bearings made flexible.

Thus, it will be understood that (e.g., see FIG. 3), when one, or several, actuators is disposed in proper alignment within guide block GB, with bearings resting firmly on respective track faces of lower guide plate 13, the upper pre-loading guide plate 11 may then be thrust into bearing-engagement so that each pair of its rail-flats contact associated bearings and spread them apart (i.e., "splay" flexible pair, shifting from "rest" axis of rotation AA of B-aa, to "pre-loaded" axis BB). This may be characterized as a "self pre-loading" roller-rail assembly. Thus, when assembly of the guide box is completed and guide plate 11 lowered in proper alignment and secured (for instance, by screws or the like to side members 15, 17 as known in the art), each pair of rail flats will be thrust between the flexibly mounted and "splayable" sets of bearings (e.g., see FIG. 2 and assume that only (some of) the bearings of roll assembly RR' are thus made flexible, with the other roller means RR having stable and relatively rigid bearings, these with non-bendable non-flexible shafts). The so-applied force and rail configurations will spread-apart (diverge or splay) each pair of flexible bearings (i.e., the shafts thereof), until they make "full-time contact" with their respective tracks, as indicated somewhat ideally in FIG. 5 and understood by workers.

Workers will recognize that such a flexible roll assembly (like RR') has many advantages. For instance, it introduces desirable tolerances in required part configuration, size and relative alignment and in the degree of preloading required. If a given preload force F-PL$_1$ is sufficient to exactly align bearings B-a, B-aa, one or both of bearings B-b, B-bb might require a bit more force $\Delta f$; hence, the designer can set overall preload force to F-PL$_1$+$\Delta f$ or more and be relatively sure that all bearings are in full engagement on their flats.

Workers may assume the following approximate exemplary dimensions:

Each head stroke: about 1"; total of 3" for 3 heads actuator carriage (e.g., A-1, FIG. 2): 0.1–0.2" thick; 1–1.5" wide; and 5–6" long, excluding coil section ball bearings (rollers): about 0.1–0.2" outside diameter, with shaft normally about 0.05" diameter (except where reduced for flexibility, e.g., to about 0.02").

ARM, FIGS. 2, 2A

An exemplary arm A-1 is seen in FIGS. 2, 2A comprising a flat medial "base" section 3 flanked by a pair of elongage side members (roller assemblies) 3-R, 3-R', joined at their trailing edge by a cross-member 3-T.

Section 3 serves to join the other members and to mount electronic chips (e.g., Read/Write, Servo) and associated connector means. To minimize mass, section 3 preferably extends little further forward than the forward rollers B-b, etc. and somewhat short of the aft rollers B-a, etc. (and one can cut-out more, leaving at least two bracing members across section 3). Similarly, side members 3-R, 3-R' are relieved along much of their outer sides (see dotted-line) making them "U-shaped" there (keep stiffness; yet reduce mass); while being relieved along their length to pass the cabling to the chips, etc. mounted on 3 (see CB, CB', FIG. 2A). Members 3-R, 3-R' further present a pair of front and rear projecting portions (11 on 3-R, 13 on 3-R', see also FIG. 5), and are defined along the edge of each portion by a pair of angular "flats", with a roller shaft mounted in each flat at the prescribed angular disposition.

The forward end of each side member is terminated by a short orthogonal platform (3-F on 3-R, 3-F' on 3-R'), each adapted to mount the proximal end of a respective load beam LB (in phantom, fragmentarily FIG. 2A), while the forward-edge of section 3 is likewise adapted to mount a third such load beam (in line with that on 3-F). Workers will recognize that this staggered, overlapping disposition of load beams takes good advantage of the forward length of arm portion 11, while preventing the load beams from interfering with one another—and still presents three (3) heads h across a disk, thus keeping the required "stroke" (along which A-1 must be reciprocated) relatively short, e.g., about 1" here (part being "landing zone"), covering disk tracks between about 4-7" radial location.

As further discussed below, tail portion 3-C is "twisted" 90° from the plane of base 3, and serves to mount the coil platform—preferably, via a tab 3-C attached to (adhesive +U-fit with 1-ch) a U-channel member 1-ch into which the coils CL, CL (e.g., two here) are potted. Thus, channel 1-ch may be made of plexiglass or like stiff non-conductor and receives the coils which may be potted in place therein. These coils may be suitably wound (e.g., 17 turns, 8 layers, 30 gauge wire, 3-7 ohms, length 1.4" by 0.4" width; or 0.2" thick) and placed in the potting (e.g., epoxy) in a respective arm-channel 1-ch.

MAGNET BLOCK MB (FIGS. 6, 7A, 7C)

Independent actuation of N arms has been thought to require N separate permanent magnet geometries. This thinking and the small inter-disk spacing have typically restricted the magnet thickness thought possible—and this ultimately limits acceleration.

Figure 6:
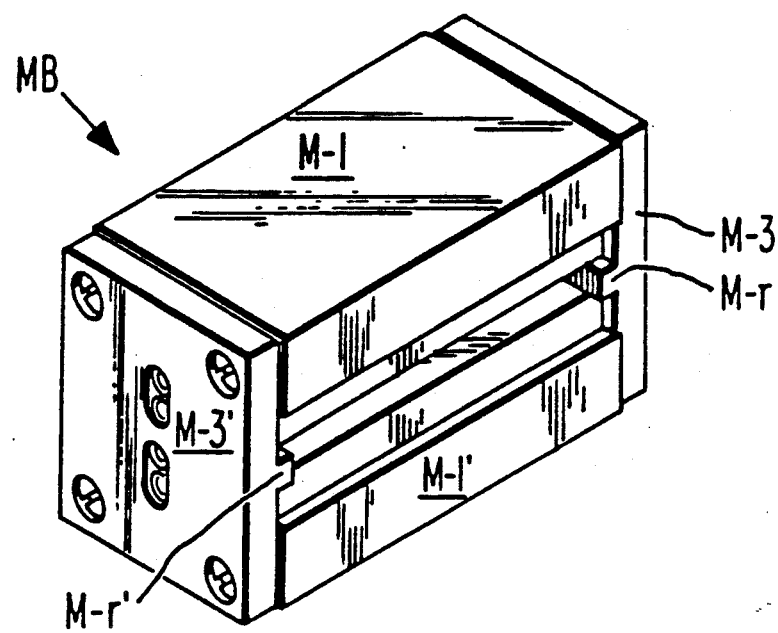
FIGS. 6, 7 show the common drive-magnet array for the above; this shown in enlarged perspective in FIG. 6, in schematic side-perspective in FIG. 7A (dual coils) and in fragmentary plan view in FIG. 7C; with FIG. 7B showing a single-coil variation.
Figure 7A:
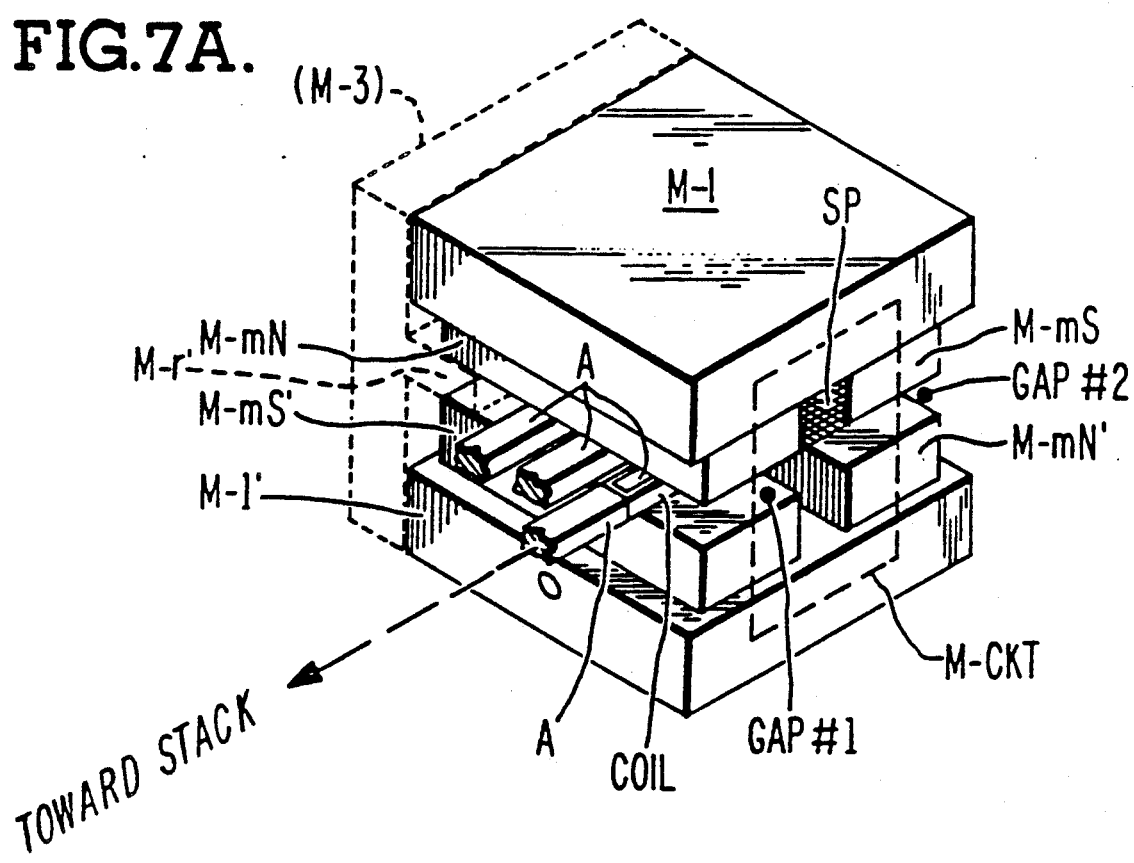
FIG. 7D showing a 3-magnet, 3-coil variation.
FIG 7E showing a 4-magnet, 4-coil variation; with FIGS. 7-C-1, 7-D-1, and 7-E-1 in schematic side-persective.

This invention changes such thinking, freeing one from the limits of the inter-disk spacing, and opening-up magnet dimensions—doing so by twisting all coil-mounts 90° away from the plane of the disks (of base 3), aligning the coils along a common plane, and surrounding them, so-aligned, with common, "shared" drive-magnet means MB (see FIGS. 6, 7A, 7C).

Thus, FIG. 6 shows the magnet block MB, or preferred array of magnets, etc. "shared-in-common" by the set of actuator arms A-1, etc. (e.g., shown in FIG. 1). Workers will recognize that, according to this feature, the four permanent magnets (see M-mN, M-mS, M-mN', M-mS' below—preferably of neodymium-iron-boron alloy (or like ferromagnetic) are arrayed to span the aligned coil-loci of all these arms and be available to provide zones of magnetic flux (see M-ckt, FIG. 7A) to drive each arm, independently, when its coil is energized. Thus, it becomes apparent that these coil areas must be so arrayed as to line-up across a common "working plane" or inter-magnet gap M-g which the opposed magnets closely surround (compare plane of coil-sections in FIG. 1 with two inter-magnet "gap" zones in FIG. 7A, where "sample" segments of arms A are shown placed). And so, when the roller-mounting-/load beam-mounting sections of these actuator arms comprise relatively flat planar members (as seen in FIGS. 2, 3A) it becomes evident how advantageous it is to twist each of the coil-sections 90° so that these sections, together, may fit into such a planar inter-magnet gap zone (common "working plane" to all arm-coils).

FIG. 7A illustrates a magnetic circuit design which can be used to allow independent actuation of any number of arm assemblies. The circuit consists of 4 magnets and 2 backing plates, each having high permeability. The magnetic flux circuit is illustrated (M-ckt); and any number of actuator arms can be stacked as shown, given a large enough gap zone.

Each arm has coil means (two here) mounted on it. Representative positions of coils (CL-1, CL-2) with respect to the magnets are shown in FIG. 7C. The passage of current through a coil results in the acceleration of that coil/arm assembly through the gap. Any number of arms can be actuated independently within the gap; simultaneously if necessary. The thickness of the magnets, and thus the strength of the field, is not restricted by the spacing of the disks—an advantage workers will prize.

Thus, in the preferred magnet block arrangement (FIGS. 6, 7A, 7C), the two magnet pairs (there may be more pairs) are arranged to present a "closed" flux circuit M-ckt as illustrated, spanning the reciprocation paths of all the coils (e.g., all positions of primary coils CL-1; or at least at the extreme in/out positions of each; and about half those of secondary coils CL-2, the rest of coils CL-2 cannot fit within magnet gap,—see FIG. 7C) so as to present driving flux (e.g., about 8000 gauss flux density here), used whenever any coil is activated.

And a flux-conducting (conserving) backing plate (keeper piece) M-1, M-1' is preferably placed across each upper/lower magnet pair to efficiently conduct flux therebetween (high $\mu$, or magnetic permeability, e.g., low-carbon steel material). The backing plates are attached, in prescribed spaced relation, on a pair of non-magnetic side-plates M-3, M-3' (e.g., of aluminum or like poor conductor of flux). Plates M-3, M-3' may also mount the magnets (e.g., kept spaced apart the prescribed distance by spacer-rib M-r, M-r' on each plate; also non-magnetic spacer means-sp on plates M-3, M-3' separates the magnets on each of M-1, M-1').

The coil sections (in eight channels, 1-ch) should be suitably separated to avoid "cross-talk", here, a separation of about 0.05" is found satisfactory (cross-talk may be further reduced through proper placement of plates of high-conductivity and/or high-permeability materials). Workers should note that this use of two coils on each arm (vs. one coil) is not only more flux-efficient but also tends to reduce "cross-talk" where the flux through one coil is opposite to that through the other; so that flux at their interface will simply "couple", leaving less flux available to "leak" outside the two-coil region.

FIG. 7B schematically and simplistically shows the relation of arm/coil units to magnets M-mN', M-mS' for single-coil arms. Note here that an extension of each arm is driven into the magnet-flux zone. We prefer to place a second coil on this arm extension and thus derive more drive-force. Such is illustrated in FIG. 7C, where arm A-8 illustrates the "OUT" position of the arm (retracted fully away from disks) and arm A-4 illustrates the opposite "IN" position (arm fully thrust toward the disk stack). For example, each magnet can be about 1" wide (w) with an inter-gap s about 0.3" and filled with a non-magnetic (e.g., aluminum) spacer.

OPERATION

Workers will understand how each arm is independently actuated by current selectively driven through its coils to interact with the flux of the permanent magnets—this being especially apt for use in a "direct-access" disk drive apparatus. In such an apparatus, the (linear) arm positioner operates responsive to electrical signals to its coils, translating it to carry its heads back and forth between disk track addresses. Such a "shared-magnet" positioner will be understood as comprising a movable, elongate non-magnetic frame on which its coils are disposed, the positioner being adapted to be reciprocated along the "magnet gap" between the common, "shared" stationary permanent magnet means, responsive to certain current through its coil windings.

Thus, an electrical address signal to the coils may be directly converted into linear actuator motion providing high speed head translation in either direction. Such independent, "shared-magnet" positioners will be seen to eliminate much unnecessary mass and reduce associated power and actuator volume (e.g., with the wound coils so potted in a "twisted" channel forming an extension of the arm-carriage frame) eliminating intermediate means and their associated mass, expense and complexity.

ASSEMBLY MODE

A particular advantage of the subject embodiment is that it may be adapted for use in existing disk drive units (like the IBM 3380, the Memorex 3680, etc.) with relatively little change or expense.

For instance, with a guide box assembled (as with GB above) and the arms A-1 through A-8 assembled therein, and with all load beams "pinched-back" (to lie in the plane of arm-flat 3), the entire guide box GB may be mounted on existing carriage structure (RM, see FIG. 3). Then, using existing rails and roller bearings (see rails, FIG. 3) the so-mounted guide box-with-arms may be rolled-into the HDA, thrusting heads h into respective inter-disk gaps. The guide box is fixed in place once the heads are inserted.

The magnet assembly MB may then be affixed on the deck plate of the drive. Then, the HDA assembly, including guide box-with-arms therein may be mounted next to the magnet assembly—using a "docking pin" dp as locating means. (dp is an elongate pin with rounded distal tip which is received in a "docking port"—not shown—when the unit is in the intended position, as known in the art.)

MODIFIED NO. MAGNETS; NO. OF COILS (FIGS. 7D, 7E)

As workers will recognize, the number of coils on each actuator arm, and the number of magnet pairs establishing the related "working flux zone" can be varied; though two coils and two magnet pairs are preferred for embodiments like that described.

For instance, FIG. 7D illustrates expansion to three coils (with extreme "OUT" and "IN" positions indicated by representative arm segments) and three magnet pairs (only one of each pair shown in this plan view—as with FIG. 7C, etc.). Recall that with two coils/two magnet pairs (FIG. 7C), the width w of each magnet was preferably a bit less than the "stroke-distance" $d_s$ (e.g., about 1" for this embodiment), while the separation space s—s, determined by "cross-talk", etc. was much less (about 0.3" for this embodiment; this set by non-conductive spacer means).

The dimensions of the (6) magnets and 2 spacers in the FIG. 7D embodiment will be comparable, except that the center-magnets M-B are preferably about twice as wide (2w) as the other magnets (note that vs. FIG. 7C or FIG. 7E, magnets M-B act to "return" flux from both sides).

In like fashion, FIG. 7E illustrates expansion to four coils and four magnet pairs (with "OUT" and "IN" extremes indicated) plus four magnet pairs—each magnet being a bit wider than arm-stroke $d_s$ as with FIG. 7C. Here, adjacent magnets "couple" to return flux (complete flux circuit—in two circuits) and conserve flux against "leakage", "cross-talk", and the like.

FURTHER VARIATIONS IN EMBODIMENTS OF FIGS. 1-7

Workers will recognize that, in certain cases, some parameters of the above embodiments can be varied for certain purposes.

For instance, a number of like actuator/guide box/magnet unit assemblies may be used (e.g., vs. the single array in FIG. 1); where available space, expense, etc. justified this.

And, the guide box can be modified, or even eliminated, especially where there is no need or desire to retrofit such an actuator array to existing equipment (and associated rails, etc.) like the Memorex #3680 Disk Drive.

Also, the coils can take another form—e.g., as printed circuit type, where space and needed drive force permit.

Further, more or fewer heads can be projected from such actuator arms—e.g., on other mounting means. The actuator arms will preferably be "linear" as shown (or mixed linear and pivoting), but in some cases a "pivoting" type will be feasible, as known in the art.

INVENTION FEATURES

Workers will recognize that I have taught several novel features, useful alone, or in combination, such as:

a—set of independent disk drive actuator arms, independently actuable, using common "shared" magnet assembly;

a-1—especially where coil-segment of arms are "twisted" 90° (to make coil-plane orthogonal to plane of disks)

a-2—especially where multiple coils provided and multiple magnet pairs (with lateral "keeper-plates");

a-2'—e.g., where wound-coils potted into ⌐channel a-3—especially where arms are guided and aligned by common "guide box" or the like a-4—especially where each arm rides on rollers with flat-tracks integrated into guide-plate in guide box a-5—especially with at least three pairs of "staggered" load-beams.

FIG. 8

FIG. 8 shows a modification of the disk drive arrangement of FIG. 1, essentially the same as in FIG. 1 except that the independent actuator arms are dispensed-with, and a more conventional single-arm structure 8-SA substituted (and a second such structure shown as optionally usable). Structure 8-SA comprises a single flat actuator arm 8-DA extending normal to the plane of the disks and mounting one (or more) drive coil means such as printed circuit coil 8-CL. Coil(s) 8-CL are intended to be magnetically driven by permanent magnet unit 8-Mg in the fashion of each of the coils afore-described (e.g., FIG. 7). Arm 8-DA serves to mount a set of arms 8-AA each adapted to present a respective array of heads to a respective inter-disk gap as known in the art. This FIG. 8 arrangement is more closely analogous to that shown in U.S. Pat. No. 4,318,145 and should help to highlight differences in the aforedescribed embodiments of FIGS. 1–7.

Figure 9:
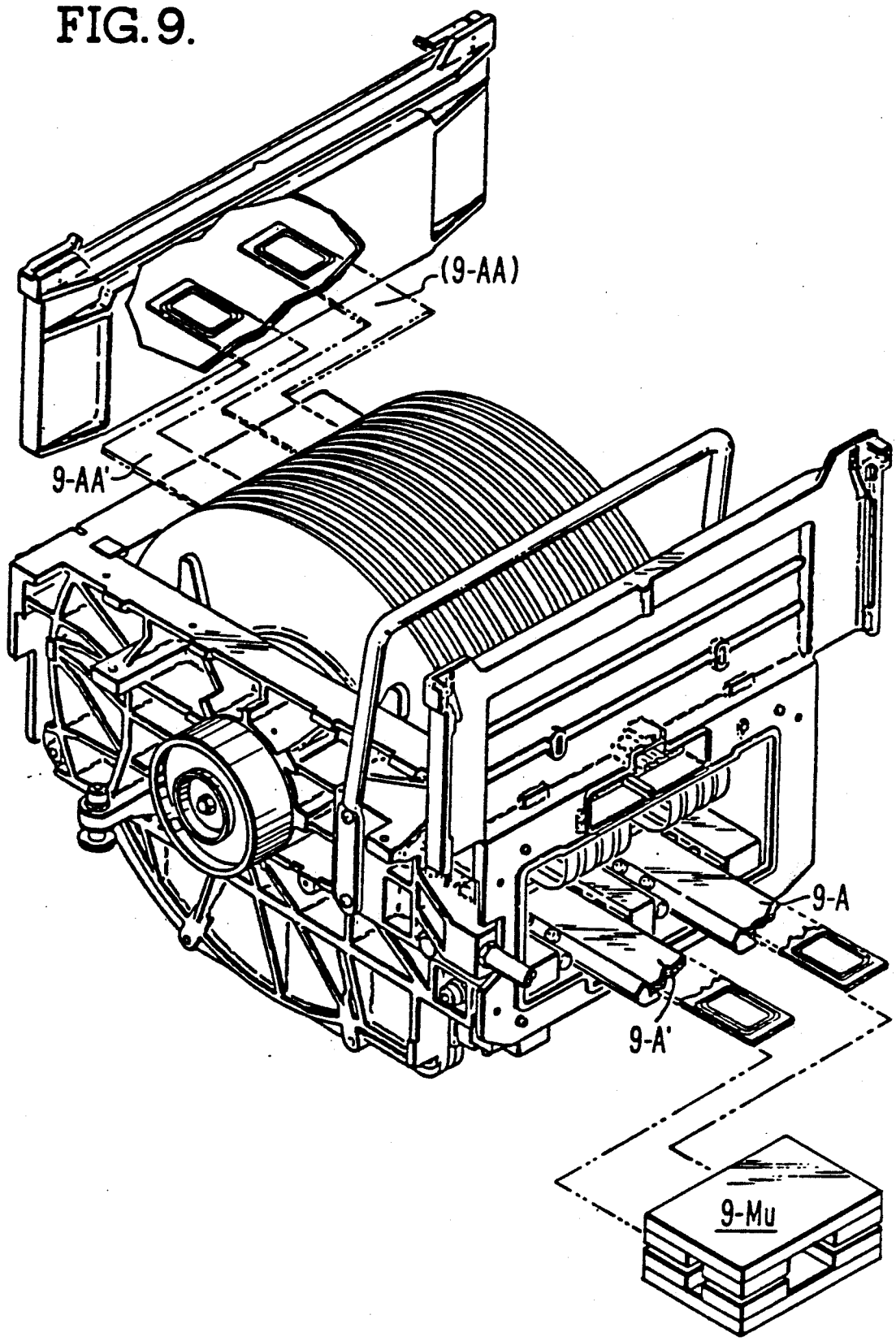

FIG. 9 shows the same as FIG. 8 except that the number of actuator arms are doubled, with each magnet-block serving two arms. Thus, four arms are shown, two 9-A, 9-A' served by one magnet block 9-Mu; while on the opposite side of the disk stack two other arms 9-AA, 9-AA' are likewise served by a second like magnet block 9-Mu' (not shown). The arms each mount one (or several) printed circuit coils and are spaced apart and inter-threaded on opposite sides; each arm having a set of like head-mounts (e.g., 5) as in FIG. 8 projecting therefrom into the respective inter-disk gaps, these mounts being "twisted 90°" from the plane of their support arm 9-A, etc. to facilitate the head insertion (as in FIG. 1, etc.).

Comparing FIG. 9 with FIG. 1, it will be evident how one aspect of the FIG. 9 embodiment involves mounting a plurality of head-mounting arm units 3 from a common coil-unit (9-A, etc.); yet with all the coil units (e.g., 9-A, 9-A') which are disposed along a common plane sharing a common driving magnet unit (e.g., 9-Mu)—this magnet unit being extendable in area to service virtually any number of such coplanar coil-units.

CONCLUSION

Workers will appreciate how aptly such "shared magnet", "twisted-tail" actuator carriages are, e.g., as mounted to drive transducer assemblies for disk drive apparatus and the like. In particular it will be appreciated that such actuators function to reduce the size, the weight, the access time and the cost of a transducer actuator and increase its acceleration accordingly—something workers in the art are now fervently awaiting. Workers will also appreciate that such actuators may be used to reciprocate other similar loads in related environments.

It will be understood that the preferred embodiments described herein are only exemplary, and that the invention is capable of many modifications and variations in construction, arrangement and use without departing from the spirit of the invention.

Further modifications of the invention are also possible. For example, the shared-magnet actuator array and methods disclosed herein are also applicable to other reciprocated loads. Also, the present invention is applicable for providing the translation/positioning required in other forms of recording and/or reproducing disk systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. In a magnetic disk drive array wherein a plurality of read-write means are projected into respective inter-disk gaps of a multi-disk stack:

one or more arrays of mounting arms disposed in parallel alignment to be individually reciprocated toward and away form the disk stack, each arm carrying one or several of the read-write means and presenting a pair of first and second side members each adapted to be so reciprocated along a respective first and second path; and integrated common guide-way means including a first fixed guide plate means rigidly mounted on fixed base means, and adapted to provide guiding, low-friction transport surfaces for all said first side members in the array; a second moveable guide plate means adapted to be coupled to, and biased toward, said first guide plate means, and parallel therewith whereby to engage and provide like guiding low-friction surfaces for all said second side members in the array and coupling means joining said first and second guide plate means so as to capture all the arm means guidingly engaging with respective guide means thereof;

said first and second side members each projecting a plurality of roller means; and said first and second guide means each presenting a set of flat tracks adapted to guidingly engage respective roller means.

2. The combination as recited in claim 1 wherein the side members project pairs of roller means disposed at a prescribed angle with respect to one another, and the guide means present pairs of flats adapted to so engage respective pairs of roller means.

3. A set of aligned independently actuated transducer actuators for a rotating disk memory apparatus, each actuator comprising:

a carriage body for mounting at least one transducer at one end of the body;

common guide means adjacent the periphery of the rotating disks of the memory apparatus for guiding the set of carriage bodies along desired respective linear paths of travel relative to each disk gap;

means for independently, selectively reciprocating each carriage to transfer a transducer means thereon to a desired track location on a rotating disk including drive coil means mounted on the carriage body;

at least one pair of permanent magnets fixedly mounted to the memory apparatus and adapted to drivingly register with each said coil means, whereby when said coil means is energized, motive forces are applied, said carriage body being mounted on a prescribed pair of roll assemblies, each assembly being adapted for rolling engagement on associated guide rail means when the rail means is disposed along a respective side of the body and comprising a first and second guide face;

each roll assembly comprising a pair of spaced roller sets disposed along a respective side of the body, each set comprising a first and second roller means, each first roller means being adapted and disposed to be engaged guidingly, and roll-ingly, with a respective first guide face; each second roller means being adapted and disposed to be similarly engaged with a respective second guide face;

the guide rail means for one side of all actuator bodies being integrated into a first guide plate; the guide rail means for the other side of all actuator bodies being integrated into a second guide plate; the first and second guide plates being coupled to form a unitary guide box for all the actuators;

said means for guiding the carriage bodies including a first rail plate rigidly mounted to a base member of the memory apparatus to determine said linear path of travel of the bodies, and a second moveable rail plate adapted to be coupled to the first plate and parallel therewith, this moveable rail plate being biased toward the fixed rail plate to engage the carriage bodies between in resilient rolling contact therewith.

4. The actuator assembly according to claim 3, wherein each rail plate comprises a set of flats adapted to engage respective roller means, these roller means being cylindrical and mounted to a respective carriage body in pairs for engagement on their flats.

5. A magnetic disk drive array wherein a plurality of read-write means are projected into respective inter-disk gaps of a multi-disk stack:

a plurality of arrays of planar mounting carriage means disposed in parallel alignment along a first direction, relatively parallel with the disk faces, to e individually reciprocated toward and away from the disk stack, each carriage means carrying one or several of the read-write means, each presenting planar face means parallel with the disk faces in the stack; and each including a pair of first and second side members flanking said face means, each side member being adapted to be so reciprocated along a respective first and second path;

integrated common guide-way means including a first guide plate means adapted to provide guiding, low-friction transport surfaces for all said first side members in the array, and a second guide plate means adapted to provide like guiding low-friction surfaces for all said second side members in the array, plus coupling means joining said first and second guide plate means, to form a unitary coupling box guiding all the carriage means;

each carriage means further including a "twisted tail" portion projected from its planar face means, on the end thereof away from said disk stack, this tail portion having planar support means twisted 90° from said first direction and carrying drive coil means; and common magnet means spanning all said tail portions, being disposed and adapted to selectively drive each whenever the said drive coil means thereof is properly energized.

6. In a disk drive array, including a stack of recording disks, a set of like reciprocable actuator bodies, each thereof being kept aligned for reciprocation between respective left and right guideways, each guideway comprising a respective track means flanking a respective side of a respective body, each body including a left and right roll means arranged along the respective sides of the body, and comprising an array of spaced rollers disposed and adapted for guided rolling engagement along a respective track means;

all said "left" track means being incorporated into a unitary "left guide plate"; all said "right" track means being incorporated into a unitary "right guide plate"; with coupling means joining said plates and engaging each track means with its respective roll means;

each actuator body further including a "twisted tail" portion projected from its planar face means on the end thereof away from said disk stack, this tail portion having planar support means twisted 90° from said first direction and carrying drive coil means; and common magnet means spanning all said tail portions, being disposed and adapted to selectively drive each whenever the said drive coil means thereof is properly energized.

* * * * *